(12) United States Patent
Leinung

(10) Patent No.: US 9,140,411 B2
(45) Date of Patent: Sep. 22, 2015

(54) COMPRESSED AIR SUPPLY DEVICE FOR COMMERCIAL VEHICLES

(71) Applicant: KNORR-BREMSE Systeme fuer Nutzfahrzeuge GmbH, Munich (DE)

(72) Inventor: Andreas Leinung, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 99 days.

(21) Appl. No.: 13/970,268

(22) Filed: Aug. 19, 2013

(65) Prior Publication Data

US 2014/0060667 A1    Mar. 6, 2014

Related U.S. Application Data

(63) Continuation of application No. PCT/EP2012/052577, filed on Feb. 15, 2012.

(30) Foreign Application Priority Data

Feb. 17, 2011   (DE) .......................... 10 2011 011 628

(51) Int. Cl.
*B60T 17/02*   (2006.01)
*B60T 13/68*   (2006.01)
(Continued)

(52) U.S. Cl.
CPC .............. *F17D 1/04* (2013.01); *B60G 17/0523* (2013.01); *B60G 17/0528* (2013.01);
(Continued)

(58) Field of Classification Search
CPC ....... B60T 13/683; B60T 8/327; B60T 17/02; B60G 17/0528; B60G 17/0523

USPC .............. 137/115, 15, 115.25, 487.5, 565.16, 137/565.18; 303/13, 15, 16
See application file for complete search history.

(56) References Cited

U.S. PATENT DOCUMENTS 7,331,592 B2    2/2008  Heer
2004/0195910 A1*  10/2004  Aumuller et al. ............... 303/15
(Continued)

FOREIGN PATENT DOCUMENTS

DE         103 33 610 B4    9/2005
DE    10 2007 013 673 A1    9/2008
(Continued)

OTHER PUBLICATIONS

International Search Report dated Oct. 1, 2012 w/ English translation (four (4) pages).
(Continued)

*Primary Examiner* — Atif Chaudry
(74) *Attorney, Agent, or Firm* — Crowell & Moring LLP

(57) ABSTRACT

A compressed air supply device for a commercial vehicle is electrically connected to an electronic control device. The compressed air supply device includes a control valve which is actuated via the control device. The control valve has an inlet, vent and outlet connections. A control line, which is connected to the outlet of the control valve, is connected to a control inlet of a compressor and/or, for regeneration, to an air filter. A supply line can supply compressed air to the control valve inlet. A venting line connects to the control valve vent. A backup valve is provided, wherein an inlet of the backup valve is connected to the supply line and an outlet can be connected to the venting line. The backup valve opens pneumatically when a pressure which corresponds to or exceeds a predetermined opening pressure is present in the supply line.

15 Claims, 8 Drawing Sheets

(51) Int. Cl.
  B60G 17/052 (2006.01)
  F17D 1/04 (2006.01)
  B60T 13/66 (2006.01)
  B60T 17/00 (2006.01)
  B60T 17/04 (2006.01)
  B60T 17/22 (2006.01)
  F15B 20/00 (2006.01)
  F15B 21/04 (2006.01)

(52) U.S. Cl.
  CPC ............ B60T 13/662 (2013.01); B60T 13/683 (2013.01); B60T 13/686 (2013.01); B60T 17/004 (2013.01); B60T 17/008 (2013.01); B60T 17/02 (2013.01); B60T 17/04 (2013.01); B60T 17/22 (2013.01); F15B 20/002 (2013.01); F15B 21/048 (2013.01); Y10T 137/6881 (2015.04)

(56) References Cited

U.S. PATENT DOCUMENTS

| | | | |
|---|---|---|---|
| 2005/0017474 A1 | 1/2005 | Heer | |
| 2008/0040013 A1* | 2/2008 | Detlefs et al. | 701/78 |
| 2010/0065129 A1* | 3/2010 | Schnittger et al. | 137/15.04 |
| 2010/0074764 A1 | 3/2010 | Schnittger et al. | |
| 2010/0186827 A1* | 7/2010 | Ertl | 137/115.25 |
| 2011/0052419 A1* | 3/2011 | Bordacs et al. | 417/53 |
| 2011/0139263 A1* | 6/2011 | Hilberer | 137/14 |
| 2012/0073669 A1* | 3/2012 | Diekmeyer | 137/1 |
| 2013/0192681 A1* | 8/2013 | Meier | 137/2 |

FOREIGN PATENT DOCUMENTS

| | | |
|---|---|---|
| EP | 1 502 778 A1 | 2/2005 |
| EP | 2 140 926 A2 | 1/2010 |
| WO | WO 2008113550 A1 * | 9/2008 |

OTHER PUBLICATIONS

German Office Action dated Nov. 10, 2011 (four (4) pages).

International Preliminary Report on Patentability (PCT/IB/373) dated Aug. 21, 2013, including English Translation of Written Opinion (PCT/ISA/237) (six (6) pages).

\* cited by examiner

COMPRESSED AIR SUPPLY DEVICE FOR COMMERCIAL VEHICLES

BACKGROUND AND SUMMARY OF THE INVENTION

In modern commercial vehicle, pneumatic systems such as compressed air brakes are frequently used. Compressed air supply devices, which in the meantime frequently have an electronic control device, serve for supplying such pneumatic systems with compressed air. In order to be able to actuate valves of the compressed air supply device via the electronic control device in a specific manner, the valves are frequently designed as solenoid valves. Therefore, a precise controlling of compressed air which is provided via a compressor and a regeneration of the air filter can be achieved.

In order to safeguard the compressed air supply for such important systems such as brakes in the event of failure of the electronic control device, for example as a result of a faulty power supply or on account of a sensor failure, provision is usually made for a back-up level which functions even without an electronic control device. However, the possibility of directed actuation of the valves is then also omitted. For example, the compressor as a rule can no longer readily be put into an energy saving state if an operating pressure of the compressed air supply device is achieved. This can lead to the compressor continuing to operate against a high pressure over a long period until a relief valve blows off the pressure at a maximum pressure level. This can lead to a considerable loading of the compressor which, for example, can even damage the compressor as a result of overheating. Furthermore, a regeneration, which can no longer be carried out, leads to air filters and consumer systems, such as brakes, being operated in a wet state.

It is an object of the present invention, in the case of an electronically controlled compressed air supply device, to provide a back-up level which enables an improved control of the compressed air supply device, and especially of a compressor, in a purely pneumatic way.

According to the invention, provision is made for a compressed air supply device for commercial vehicles which is electrically connected, or electrically connectable, to an electronic control device. The compressed air supply device has at least one control valve which can be controlled via the electronic control device, wherein the control valve has at least one inlet port, a vent port and an outlet port. A control line is connected to the outlet port of the control valve, wherein the control line is connected, or connectable, to a control input of a compressor and/or to an air filter for a regeneration. Provision is made for a supply line via which compressed air is directed, or can be directed, to an inlet port of the control valve, and also a vent line which is connected to the vent port of the control valve. Furthermore, provision is made for backup valve, wherein an inlet of the back-up valve is connected to the supply line and an outlet of the back-up valve is connected, or connectable, to the vent line. The back-up valve is designed in such a way that it opens pneumatically if there is a pressure in the supply line which corresponds to a predetermined opening pressure, or exceeds this. Therefore, via the back-up valve provision can be made for a pneumatic back-up level which even with a failed electronic control device enables a pressure build up in the control line via the back-up valve—which is switched into the open position—the vent line and the vent port of the control valve. Therefore, via the control line a compressor, for example, can be controlled in such a way that it is switched into an energy-saving state.

Alternatively or additionally, the carrying out of a regeneration is possible without a functioning electronic control device. The back-up valve can have a vent outlet close to its inlet and its outlet, which can be connected, or be connectable, to a vent to atmosphere.

Pneumatic opening of the back-up valve means that the back-up valve pneumatically creates a fluid-conducting connection between its inlet and its outlet. In this case, a possibly existing vent outlet of the back-up valve can be shut off. Pneumatic closing of the back-up valve means that the back-up valve shuts off or breaks a connection between the outlet of the back-up valve and the inlet of the back-up valve. In this case, a connection between the outlet and a possibly existing vent outlet of the back-up valve can be created.

The back-up valve can have a normal position and an open position. The normal position can correspond to the position which the back-up valve occupies if the pressure in the supply line is insufficient for the opening of the back-up valve. In the normal position, the connection between an inlet and an outlet of the back-up valve can be shut off. Should the back-up valve have a vent port, a connection between the outlet of the back-up valve and the vent outlet can be provided in the normal position. In the open position, the inlet of the back-up valve can be connected to the outlet of the back-up valve. A possibly existing vent outlet of the back-up valve can be shut off.

The back-up valve can be designed in such a way that as a result of a pneumatic opening it occupies the open position, that is to say transfers from the normal position into the open position when the opening pressure in the supply line is achieved or exceeded. The back-up valve can be a 3/2 directional valve. As a result, leakages of the back-up valve, which lead to compressed air being able to flow from the supply line to the outlet of the back-up valve in the normal state, can especially be compensated. The 3/2 directional valve can especially have an inlet, an outlet and a vent outlet. In the normal position, the outlet can preferably be connected to the vent outlet of the 3/2 directional valve.

Alternatively, the back-up valve can be a 2/2 directional valve. As a result, a particularly simple and inexpensive construction can be achieved.

The actuation of the control valve can be electrically carried out by the electronic control device in an indirect or direct manner, for example by energizing electromagnetic components of the valve. The control valve can especially be designed as a solenoid valve. It is also conceivable that the control valve, in addition to a pneumatic valve, has a solenoid valve component for piloting the pneumatic valve, which is actuated by the electronic control device. It is conceivable to design the control valve as a 3/2 directional valve. The vent port of the control valve can be connected, or be connectable, via the vent line to a vent to atmosphere. In a normal position, the control valve can be switched in such a way that it connects the control line to the supply line, that is to say that a fluid-conducting connection exists between the outlet port and the vent port. The inlet port and therefore the supply line can be shut off in the normal position. Therefore, in the normal position of the control valve the control line can be vented, or be ventable. In a free-passage position of the control valve, the control valve can be switched in such a way that it connects the control line in a fluid-conducting manner to the supply line and shuts off the vent line. Therefore, the inlet port and the outlet port are interconnected in a fluid-conducting manner and the vent port is shut off.

The electronic control device can make it possible to switch the control valve between the normal position and the free-passage position. It can be expedient to design the control valve in such a way that it occupies the normal position if it is not actuated via the electronic control device and/or is not energized. To this end, provision can be made, for example, for a return device, such as a spring arrangement, which preloads the control valve in the normal position.

The electronic control device can be considered to be part of the compressed air supply device or can be formed separately therefrom. The compressed air supply device can comprise a compressor, or can be considered to be separate from the compressor or considered to be a separable device.

The control line can especially be connected, or be connectable, to a compressor control input, via which the compressor can be pneumatically controlled. It is conceivable, for example, that the compressor, when a pressure is applied to its control input, for example switches into an energy-saving mode via the control line. In an energy-saving mode, the compressor can, for example, be decoupled or disconnected from a drive or a shaft, or its output capacity can be greatly reduced. If no pressure is applied to the control input of the compressor, the compressor can be operated in such a way that it delivers compressed air for the compressed air supply device.

An air filter can be part of the compressed air supply system. A regeneration of the air filter can be carried out in such a way that compressed air from the compressed air supply device is blown off through the air filter to a vent to atmosphere in order to remove water and contaminants which have collected in the air filter. In this case, the control line can be connected, for example, to a check valve for the regeneration, or can be connected to an additional control valve which can act for controlling or initiating a regeneration.

Within the context of this description, a connection or fluid-conducting connection between two pneumatic components or a line and a pneumatic component such as a valve, constitutes a pneumatic connection via which compressed air can be directed. A commercial vehicle can especially be a lorry or a mobile working machine, such as a tractor. A rail vehicle can also be considered to be a commercial vehicle.

By means of the electronic control device, a normal operating pressure of the compressed air supply device can be predetermined and/or monitored. For example, the electronic control device can be designed in such a way to stop the compressed air feed when the operating pressure is achieved by, for example, the compressor being switched into its energy-saving mode. It can be provided that the electronic control device detects the pressure in the compressed air supply device at one point, or at a plurality of points, by means of suitable sensors, and shuts down or decouples the compressor when the desired operating pressure is achieved. To this end, the electronic control device can, for example, actuate the control valve in such a way that the control line is pressurized in order to apply a pressure signal to the compressor control input. An operating pressure can lie, for example, at about 12 or 12.5 bar. The operating pressure can especially be measured in the supply line.

For the protection of the compressed air supply device, provision is frequently made for a maximum safety pressure which the device must not exceed in any event. In order to avoid this safety pressure being exceeded, use is frequently made of a relief valve which undertakes a venting to atmosphere when said safety pressure is exceeded. The relief valve which is used for this can also be used as an actuated bleed valve for a regeneration, which opens a connection to atmosphere. The opening pressure of the back-up valve expediently lies below this safety pressure. It is also conceivable that the conventional relief valve is replaced by the back-up valve because by using the back-up valve an exceeding of the opening pressure in the compressed air supply device can be reliably prevented by shutting down the compressor and/or by initiating a regeneration or other bleed of pressure. Therefore, the opening pressure can be considered to be the safety pressure, for example.

It can be provided that the compressed air supply device also has at least one vent valve with an inlet, an outlet and an air bleed. The inlet of the vent valve is connected, or connectable, to the outlet of the back-up valve and the outlet of the vent valve is connected, or connectable, to the vent port of the control valve. Via the vent valve, switching between an aerating and venting of the vent port of the control valve can be quickly carried out. It is conceivable that more than one control valve is connected in each case via its vent port to the outlet of the vent valve and/or that at least one vent valve is associated with each control valve. The outlet of the vent valve can be connected, or be connectable, via the vent line to the vent port or to the vent ports of the control valves. Therefore, a connection between the back-up valve and the vent port of the control valve via the vent valve can be achieved. In general, a valve which has an inlet, an outlet and an air bleed can be considered to be a vent valve. The air bleed can be connected, or be connectable, to a vent to atmosphere. A vent valve can be designed as a 3/2 directional valve. It can be expedient that in the vent valve, when the inlet is vented, the outlet is connected to the air bleed and so is also vented. If the inlet is aerated, the vent valve can connect the outlet to the inlet and shut off the air bleed so that a fluid-conducting connection exists between inlet and outlet of the vent valve. In this position, the vent valve can be referred to as being open. Since a pressure is present at the aerated inlet, a line which is connected to the outlet is therefore aerated. A vent valve can especially be pneumatically actuated, or able to be pneumatically actuated.

The compressed air supply device can have a second control valve which can be actuated via the electronic control device, wherein an outlet port of the second control valve is connected, or connectable, to the air filter for a regeneration. The other control valve can be connected, or be connectable, via the control line to a control input of the compressor. As a result, especially with a suitable switched position of the second control valve, an air flow, which is provided for the regeneration of the air filter, can be directed via the outlet port of the second control valve. A regeneration line, which is provided for the regeneration of the air filter and which is connected to the outlet port of the second control valve, can therefore be considered to be a second control line which is associated with the second control valve. The second control valve can be designed similarly to the control valve described above and can especially have an inlet port, an outlet port and a vent port. The second control valve can be designed as a 3/2 directional valve. The second control valve can be a solenoid valve. A vent port of the second control valve can be connected to an associated second vent line. This second vent line can be connected, or be connectable, to a vent to atmosphere. It is conceivable that the second vent line is connected, or connectable, to the outlet of the back-up valve. Such a connection can be effected for example via an interposed valve. The interposed valve can be the aforementioned vent valve. In general, the outlet of the back-up valve can be connected, or be connectable, via a vent valve to the vent outlet of the first control valve and/or to the vent outlet of the second control valve. Provision can be made for a connection junction, for example, which connects the vent line which is connected to the control valve to the second vent line which is connected to the second control valve, and leads both to the vent valve.

In one development, a vent port of the second control valve can be connected to an outlet of a second vent valve, for example via an associated second vent line. Via the second vent valve, a fast and controlled venting of the second control valve can therefore be carried out.

It is conceivable that the outlet of the back-up valve is connected to the inlet of a second vent valve. Via the second vent valve, for example the actuation or compressed air supply of a second control valve is possible. Therefore, the back-up valve can also supply a second control valve with compressed air via the second vent valve in such a way that the outlet port of the control valve, with the back-up valve open, is pressurized, as a result of which for example a regeneration of the compressed air supply system independently of the electronic control device becomes possible.

Between the outlet of the back-up valve and the inlet of the at least one vent valve, provision can be made for a bypass line which is connected to a vent. Therefore, an undesirable pressure build-up upstream of the inlet of the vent valve can be prevented. The inlet of the vent valve can especially be connected via the bypass line to a vent to atmosphere. If more than one vent valve is provided, the bypass line can be arranged in such a way that it is connected to the inlets of all the vent valves. If no separate vent valve is provided, the outlet of the back-up valve can still be connected via a corresponding bypass line to a vent to atmosphere. Therefore, for example an undesirable pressure build-up in a vent line to a control valve can be avoided.

In one development, a restrictor can be provided in the bypass line. As a result, on the one hand an undesirable pressure build-up as a result of leakage in the back-up valve, for example, can be prevented, and on the other hand a desirable pressure build-up upstream of a vent valve or in a vent line can be carried out. The restrictor can especially have an effective flow cross section for a flow for venting to atmosphere which is smaller than an effective flow cross section for a flow from the outlet of the back-up valve to an inlet of the vent valve or to the inlets of the vent valves, or via a vent line to the vent port, or vent ports, of the vent valves, or via a vent line to the vent port, or ports, of at least one control valve. Therefore, a sufficient pressure build-up in the line to the inlet of the vent valve can be achieved, for example, so that the vent valve, or vent valves, with the back-up valve open, actually open themselves and a fluid-conducting connection between the inlets and outlets of these valves is created, although air discharges via the bypass line.

The at least one vent valve can be a fast-acting vent valve. Therefore, a particularly fast venting via the vent valve can be ensured. A fast-acting vent valve can especially provide a large flow cross section for a connection from its outlet to an air bleed for venting to atmosphere. A fast-acting vent valve can especially have a membrane which enables a fast switching over of the switching states of said fast-acting vent valve. Naturally, all the vent valves, which are connected to the back-up valve, can be designed as fast-acting vent valves.

It can be expedient that the opening pressure of the back-up valve is greater than an operating pressure which can be established, or is established, by means of the electronic control device. Via the back-up valve, therefore, for when the compressor delivery is over and above the predetermined operating pressure, the compressor can be shut down when the opening pressure is reached and be protected against overheating and/or a regeneration can be carried out.

The back-up valve can be designed in such a way that it closes pneumatically if the pressure in the supply line has dropped to a pressure below a predetermined closing pressure. The closing pressure can be equal to, or lower than, the opening pressure. It can especially be provided that the closing pressure is lower than the operating pressure so that a pressure range is defined in which the back-up valve is opened so as not to frequently switch the compressor back and forth between its switching states, for example, or in order to enable a complete regeneration of the air filter. A pneumatic closure on account of a lowered pressure can follow an opening of the back-up valve.

BRIEF DESCRIPTION OF THE DRAWINGS

The invention is now exemplarily explained based on preferred embodiments with reference to the attached drawings.

In the drawings.

DETAILED DESCRIPTION OF THE DRAWINGS

In the figures, continuous lines and lines with short dashes represent compressed air connections, whereas lines with long dashes represent electrical signal lines.

Figure 1:
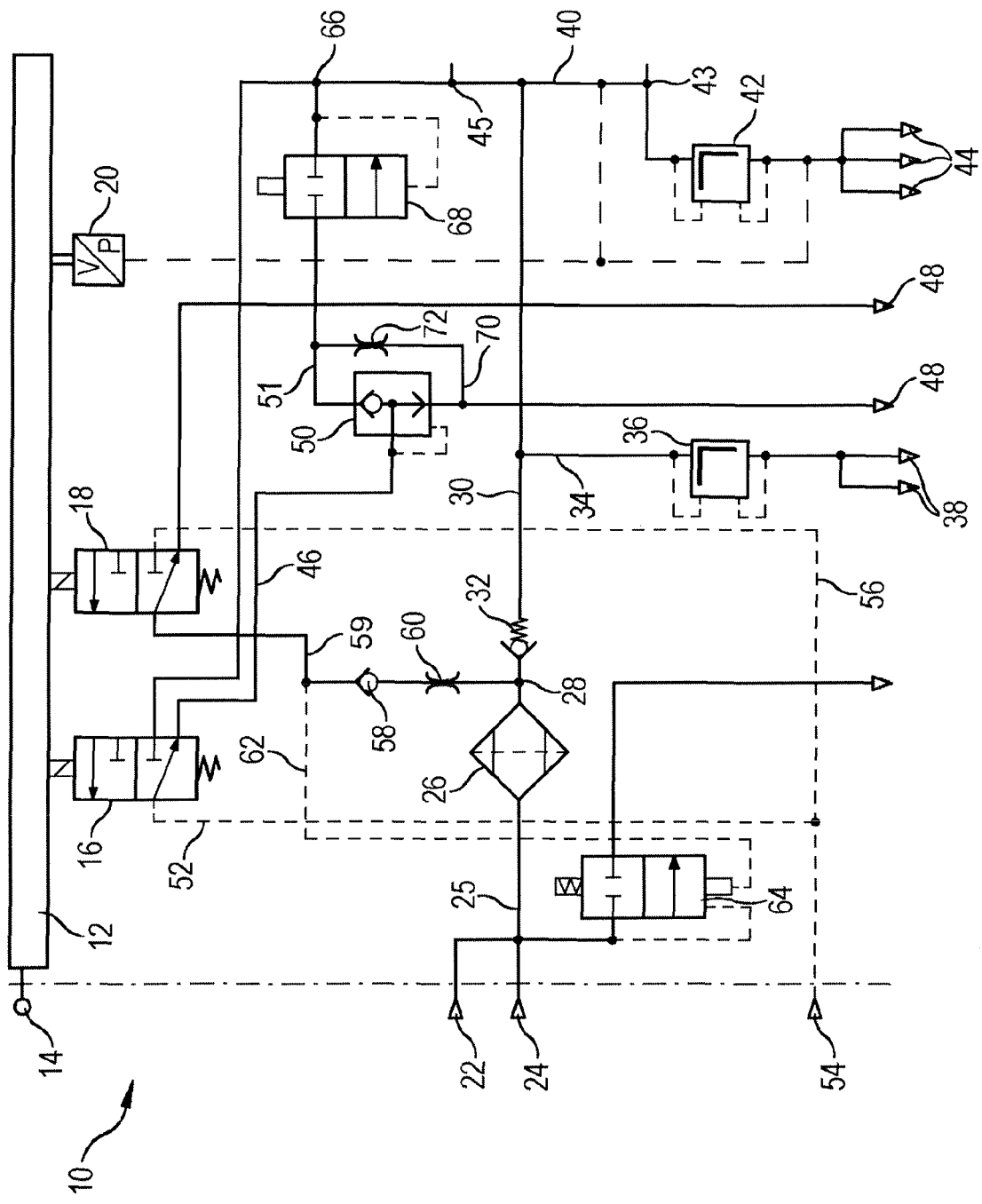
FIG. 1 shows a schematic partial representation of a compressed air supply device.

Shown schematically in FIG. 1 is a part of a compressed air supply device 10. The compressed air supply device 10 comprises an electronic control device 12. This is connected, or connectable, via a central connector 14, to a vehicle's electronic system. The electronic control device 12 is designed, for example, for electrically actuating a first control valve 16 and a second control valve 18 which are designed in each case as a solenoid valve. A pressure sensor 20 can transmit a pressure signal to the electronic control device 12, which in this example indicates the pressure in the supply line and in a consumer system downstream of a relief valve which is described further below.

The compressed air supply device 10 has a compressor connection or compressed air inlet 22 via which compressed air can be provided by a compressor. Via an external connection or compressed air inlet 24, an external filling of the compressed air supply device 10 or consumer connected thereto can be carried out from outside, bypassing the compressor. The two inlets 22, 24 are connected via an inlet line 25 to an air filter 26, which serves for filtering out contaminants, such as water or oil, from the air which is supplied from the compressed air supply device.

Downstream of the air filter 26, provision is made for a connecting line 28 to a supply line 30 which directs, or can direct, compressed air which has been cleaned by the filter 26 to an inlet port of the first control valve 16. In order to protect the supply line 30 against a pressure loss, a check valve 32 is provided between the connecting line 28 and the supply line 30. The check valve 32 is arranged downstream of the air filter 26 to the supply line 30 in such a way that air cannot flow back via the supply line 30 to the air filter 26. Downstream of the check valve 32, a compressed air line 34 branches from the supply line 30. The pressure line 34 in this example leads via a first relief valve 36 to connections 38 for supplying a pneumatic spring system, which is not shown.

Downstream of the compressed air supply line 34, a further compressed air supply line 40 branches from the supply line 30. In this example, this leads via a branch 43 to a second relief valve 42 and further to connections 44 for supplying a first brake circuit, which is not shown. From the branch 43, a second branch, which is not identified in more detail, leads via a relief valve, which is not shown, to a further consumer, for example to a second brake circuit. Similarly, via the supply line 30, via a further branch 45, a supply can be carried out to further compressed air consumers such as trailer brakes, a parking brake, or similarly known consumer devices of a commercial vehicle. The sensor device 20 is provided for monitoring the pressure downstream of the relief valve 42 and in the supply line 30.

The supply line 30 is furthermore connected to an inlet port of the first control valve 16. A vent outlet of the first control valve 16 is connected to a vent line 46, which is connected to a vent 48. A vent valve 50, which has an inlet, an outlet and an air bleed, is provided in the vent line 46. In this example, the vent valve 50 is designed as a fast-acting vent valve. The outlet of the vent valve is connected via the vent line 46 to a vent port of the first control valve 16. The air bleed of the vent valve 50 is connected to a vent 48 to atmosphere. The inlet of the vent valve 50 is connected to a back-up line 51. A control line 52 is connected to an outlet port of the first control valve 16.

The first control valve 16 is designed as a 3/2 directional valve. The control line 52 in this example leads to a control input 54 of a compressor, which is not shown. It is provided that when the control line 52 is aerated, that is to say a pressure above the atmospheric pressure is present in it via the supply line 30, the compressor is switched into an energy-saving mode, for example by it being decoupled or completely shut down.

A regeneration control line 56, which is connected to an inlet port of the second control valve 18, branches from the control line 52. Therefore, the supply line 30, the first control valve 16, the control line 52 and the regeneration control line 56 for the second control valve 18 altogether act as a supply line via which compressed is fed, or can be fed, to the inlet port of the second control valve 18. A vent port of the second control valve 18 is connected to a vent 48 to atmosphere. An outlet port of the second control valve 18 is connected via a regeneration line 59 to the connecting line 28 between the air filter 26 and the check valve 32. In the regeneration line 59, which can be considered to be the control line which is associated with the second control valve 18, a regeneration check valve 58 and a regeneration restrictor 60 are connected in series. In the case of a regeneration being carried out, the regeneration check valve 58 prevents air, which is provided for the regeneration, from flowing into the line 59 again in the direction of the second control valve 18. Via the regeneration restrictor 60, a flow which is suitable for the regeneration is established. Therefore, the regeneration check valve 58 and the second control valve 18 can be considered to be a regeneration valve in each case.

Between the regeneration check valve 58 and the second control valve 18, a "shut off" valve control line 62 branches from the regeneration line 59. The bleed control line 62 leads to a bleed valve 64. The bleed valve 64 can be designed as a 2/2 directional valve. In the normal state, when no pressure signal actuates the bleed valve 64 via the bleed control line 62, the bleed valve 64 shuts off a connecting line between the inlet line 25 and a vent 48 to atmosphere. If a pressure signal is transmitted to the bleed valve 64 via the bleed control line 62, the bleed valve switches into its free-passage position in which it connects the inlet line 25 to the vent 48 in a fluid-conducting manner. Such a connection is also created by means of the bleed valve 64 when the pressure in the inlet line 25 or in the compressed air supply device 10 exceeds a predetermined safety pressure which can lie at about 14 or 15 bar. Via the bleed valve 64, a regeneration of the air filter 26 can be carried out by a venting possibility being created for air which originates from the regeneration line 59 and flows through the air filter 26.

The supply line 30 is also connected via a branch 66 to a back-up valve 68. An inlet of the back-up valve 68 is especially connected via the branch 66 to the supply line 30 so that a pressure, which prevails in the supply line 30, is present at the inlet of the back-up valve 68. An outlet of the back-up valve 68 is connected to the back-up line 51. Therefore, there is a connection between the outlet of the back-up valve 68 and the inlet of the vent valve 50. A bypass line 70, in which a restrictor 72 is arranged, branches from the back-up line 51 between the back-up valve 68 and the vent valve 50. The bypass line 70 offers a restricted connection between the back-up line 51 and a vent 48 to atmosphere.

The back-up valve 68 in this example is a 2/2 directional valve. In the normal state, the back-up valve 68 shuts off a connection between its inlet and outlet. It is designed in such a way that when a predetermined opening pressure in the supply line is exceeded it pneumatically opens and creates a connection between its outlet and inlet. The opening pressure is expediently higher than the operating pressure—which is monitored by the electronic control device 12 and corresponds to the maximum pressure—up to the point where the electronic control device 12 fills the compressed air supply device 10 or the supply line 30 before it shuts down the compressor.

During operation, the compressed air supply device 10 is supplied with compressed air via the compressor. The compressed air flows via the inlet line 25 through the air filter 26 and the connecting line 28 and also the check valve 32 into the supply line 30. Via this, the compressed air can be distributed via relief valves, for example the relief valves 36 and 42, and the branches 43, 45 to the consumer systems. At the same time, the pressure in the supply line 30 is applied to the inlet port of the first control valve 16. The first control valve 16 and the second control valve 18 are in de-energized state in a normal position in each case, that is to say when they are not actuated by the electronic control device 12.

In the normal position, in the valve, the outlet port of one control valve 16, 18 is connected in each case to the vent outlet of the same control valve 16, 18, whereas the inlet port is shut off. Therefore, in the depicted de-energized state the outlet port of the first control valve 16, which is connected to the control line 52, is connected to the vent port which is connected via the vent line 46 and the vent valve 50 to the vent 48. Since during the functioning of the electronic control device the operating pressure is not exceeded, the back-up valve 68 remains closed. Therefore, the back-up line 51 is vented and the vent valve 50 is in a position in which it vents the vent line 46.

In the depicted de-energized state, the second control valve 18 is switched in such a way that the regeneration line 59 is connected to the vent port of the second control valve 18 and therefore connected to the vent 48. In the energized state, the first control valve 16 and the second control valve 18 are switched into the free-passage position. In the free-passage position, the inlet port and the outlet port are interconnected in a fluid-conducting manner in each case, whereas the vent port is shut off. Therefore, in the free-passage position the outlet port of the first control valve 16, which is connected to the control line 52, is connected in a fluid-conducting manner to the inlet port which is connected to the supply line 30. The second control valve 18 is switched into the free-passage position in such a way that the regeneration control line 56, via the inlet port of the second control valve 18, is connected in a fluid-conducting manner via the outlet port of the second control valve 18 to the regeneration line 59. If the pressure inside the compressed air supply device 10 achieves the predetermined operating pressure, which can lie at about 12.5 bar, for example, the electronic control device 12 shuts the compressor down. To this end, the first control valve 16 is switched into its free-passage position so that the control line 52 is aerated via the supply line 30 and therefore the high operating pressure is applied. The pressure in the control line 52 is on the one hand transmitted via the connection 54 to the compressor which subsequently switches into its energy-saving state. Furthermore, the pressure in the control line 52 is also applied via the line 56 at the inlet port of the second control valve 18. If now the second control valve 18 is also switched into its free-passage position by the electronic control device 12, compressed air can flow from the supply line 30 via the first control valve 16, the control line 52, the regeneration control line 56 and the second control valve 18 into the regeneration line 59. Therefore, on the one hand the bleed valve 64 is switched via the bleed control line 62 into its free-passage position. On the other hand, compressed air can flow via the regeneration check valve 58, the regeneration restrictor 60 and the air filter 26 to an inlet port of the bleed valve 64. Via this, a connection to the vent 48 is created so that compressed air can flow opposite the conventional flow direction through the air filter 26 in order to regenerate the air filter 26. Therefore, the electronic control device 12, by actuation of the first control valve 16, can actuate an energy-saving mode for the compressor.

In addition, by actuation of the second control valve 18, a regeneration of the air filter 26 is undertaken. If the first control valve 16 is switched into its normal position again, the control line 52 is connected to the vent line 46. Air therefore flows from the control line 52 via the vent line 46 and the vent valve 50. Since the vent valve 50 is designed as a fast-acting vent valve with a large venting cross section, a faster pressure drop in the control line 52 is achieved, as a result of which the compressor is quickly transferred into its operating state. Furthermore, no additional pressure is redelivered to the second control valve 18 via the supply line 30, as a result of which the regeneration is stopped. Also, the second control valve 18 is expediently transferred into its de-energized state, as a result of which the regeneration line 59 and the bleed control line 62 are also vented. The bleed valve 64 therefore shuts off the connection to the vent.

If now the electronic control device 12 should fail or the control valves 16, 18 should no longer be able to be energized or actuated for other reasons, the compressor would allow the pressure in the compressed air supply device 10 to increase up to the safety pressure, whereupon the bleed valve 64 opens. In this case, the compressor would have to perform considerable work against a high pressure which prevails in the compressed air supply device 10, as a result of which a heavy loading and a risk of overheating for the compressor would arise. In order to avoid this, the back-up valve 68 is provided. This opens when the opening pressure is achieved so that via the back-up line 51 the pressure in the supply line 30 is directed to the inlet of the vent valve 50. By means of the restrictor 72 which is provided in the bypass line 70, a sufficient pressure build-up upstream of the vent valve 50 is enabled although the back-up line 51 is connected to atmosphere. To this end, the flow cross section of the restrictor 72 is suitably selected. Therefore, the vent valve 50 opens and connects its inlet to its outlet. Therefore, compressed air can flow from the supply line 30 via the back-up valve 68 and the vent valve 50 into the vent port of the first control valve 16. In the de-energized state, this vent port is connected to the outlet port of the first control valve 16 so that a pressure build-up is created in the control line 52, as a result of which the compressor is switched into its energy-saving state. If the pressure in the supply line 30 drops, for example as result of brake operations or as a result of a creeping loss via the bypass line 70 below a predetermined closing pressure, the back-up valve 68 closes again and so interrupts the compressed air feed via the back-up line 51. Therefore, the vent valve 50 closes, no later than after a complete pressure loss in the back-up line 51 via the bypass line 70, and reconnects its outlet to the vent 48. The control line 52 is therefore vented and the compressor is switched over again so that compressed air is delivered again by the compressor via the inlet 22.

It is expedient if the back-up valve 68 pneumatically opens at a pressure in the supply line 30 which lies between the normal operating pressure, that is to say at about 12.5 bar, and a maximum permissible pressure, that is to say approximately at the safety pressure of about 15 bar. The closing pressure can lie below the opening pressure. The closing pressure can especially be equal to, or lower than, the operating pressure in order to define a suitable pressure range in which the compressor remains shut down or switched in the energy-saving mode. It is conceivable to omit the vent valve 50. In this context, the back-up valve 68 can be designed as a 3/2 directional valve which has a vent outlet which is connected to a vent 48 to atmosphere. In the normal position, the vent outlet of the back-up valve 68 can be connected to the outlet of said back-up valve 68. The outlet of the back-up valve 68 can then be connected directly to the vent line 46 without a bypass line or a further connection to the vent 48 being necessary. Therefore, the vent outlet of the first control valve 16 can be connected directly to the outlet of the back-up valve 68. If the back-up valve should be designed as a 2/2 directional valve, a bypass line can also be provided with a restrictor, without the vent valve, in order to prevent an excessively rapid pressure drop.

FIGS. 2 to 7 show a schematic partial representation of a further compressed air supply device in different switching states. For reasons of simplicity, elements which are identical to or functionally similar to elements of the compressed air supply device which is shown in FIG. 1 are provided with the same designations in the following text.

Figure 2:
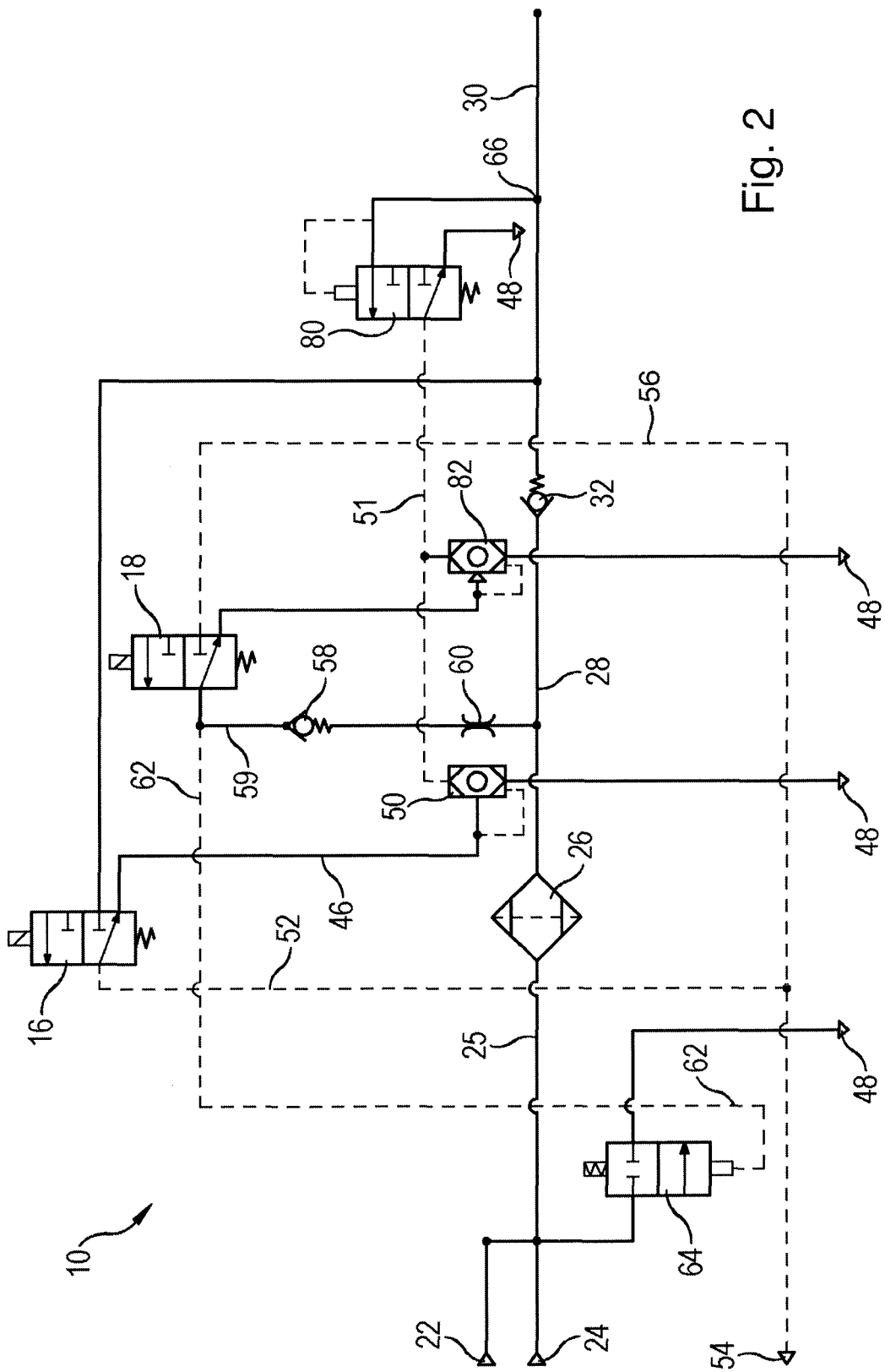
FIG. 2 shows a schematic partial representation of a further compressed air supply device in an exemplary first switching mode.

The compressed air supply device 10 which is shown in FIG. 2 has a compressor connection 22 and an external filling connection 24. The electronic control device with central connector and electrical or electronic components which are connected thereto are not shown, but can be provided as in FIG. 1. Via the inlet line 25, the air filter 26, the connecting line 28 and the check valve 32, compressed air can flow to the supply line 30 which can be connected to consumer systems, which are not shown. A branch of the supply line 30 is directed to an inlet port of a first control valve 16 which is designed as a solenoid valve. An outlet port of the first control valve 16 is connected to a control line 52 which is connected to a control input 54 of a compressor. A vent valve, especially a fast-acting vent valve, which is not shown, can be connected between the control input 54 and the first control valve 16. An inlet of the vent valve can especially be connected to the outlet port of the first control valve 16. An outlet of the vent valve can be connected to the control input 54. An air bleed can be connected to a vent to atmosphere in order to enable a particularly fast switching over when engaging the compressor. A similar solution is also possible in conjunction with the example which is shown in FIG. 1.

A regeneration control line 56 branches from the control line 52 and is connected to an inlet port of a second control valve 18 which is designed as a solenoid valve. An outlet port of the second control valve 18 is connected to a regeneration line 59 which is connected via a regeneration check valve 58 and a restrictor 60 to the connecting line 28.

A bleed control line 62 branches from the regeneration line 59 between the check valve 58 and the second control valve 18. The bleed control line 62 is connected to the control element of a bleed valve 64. The bleed valve 64 is arranged in a connecting line between the inlet line 25 and a vent 48 to atmosphere.

As in the example which is described with reference to FIG. 1, a branch 66 is provided from the supply line 30 and is connected to an inlet of a back-up valve 80. With regard to the connections of the vent ports of the control valves 16, 18 and the design and arrangement of the back-up valve 80, the example which is shown in FIG. 2 differs from the example which is shown in FIG. 1. The back-up valve 80 is designed as a 3/2 directional valve. It has an inlet, an outlet and a vent outlet. The vent outlet is connected to a vent 48 to atmosphere. In its normal position, the back-up valve 80 connects its vent outlet to its outlet and shuts off its inlet. Therefore, in the normal position no compressed air can flow from the inlet to the outlet of the back-up valve 80. If at least a predetermined opening pressure—which can be defined as described above—is applied in the supply line 30 and therefore at the inlet of the back-up valve 80, the back-up valve 80 opens in such a way that it connects its inlet to its outlet and shuts off the vent outlet. In this example, the opening pressure can lie at 14 bar. If the pressure in the supply line 30 and at the inlet of the back-up valve 80 drops below a specified closing pressure—which can be defined as described above—then the back-up valve 80 reverts to its normal position. In this example, the closing pressure can lie at 11 bar and therefore can be lower than the operating pressure which can be 12.5 bar, for example.

The outlet of the back-up valve 80 is connected via a back-up line 51 to the inlet of a first vent valve 50 and of a second vent valve 82. In this example, both vent valves 50, 82 are designed as fast-acting vent valves in order to enable a fast switching over. An outlet of the first vent valve 50 is connected via a vent line 46 to the vent outlet of the first control valve 16. An outlet of the second vent valve 82 is connected to the vent outlet of the second control valve 18. An air bleed of the first vent valve 50 and the air bleed of the second vent valve 82 are connected in each case to a vent 48 to atmosphere. It is understood that in the examples which are specified here the vents to atmosphere can be designed individually or as a common vent.

For the compressed air supply device which is shown in FIG. 2, there are different switching states or switching modes. Basically, the back-up valve 80 remains in its normal position as long as the pressure in the supply line 30 does not reach the opening pressure. In the normal position of the back-up valve 80, the back-up line 51 is vented, which is why both vent valves are in a state in which their outlets are vented to atmosphere. As long as the electronic control device is operational, it avoids the pressure in the supply line rising above a predetermined operating pressure so that the opening pressure, which lies above this operating pressure, is not reached during normal operation.

If the pressure in the compressed air supply device and especially in the supply line 30 lies below the operating pressure, the electronic control device switches the compressed air supply device into a first switching mode, which is shown in FIG. 2. In the first switching mode, the electronic control device leaves the first control valve 16 and the second control valve 18 in the normal position in each case. Therefore, the control line 52 and the regeneration line 59 remain vented via the vent valves 50 and 82. The compressor remains engaged and delivers compressed air which is fed via the compressed air inlet 22.

Figure 3:
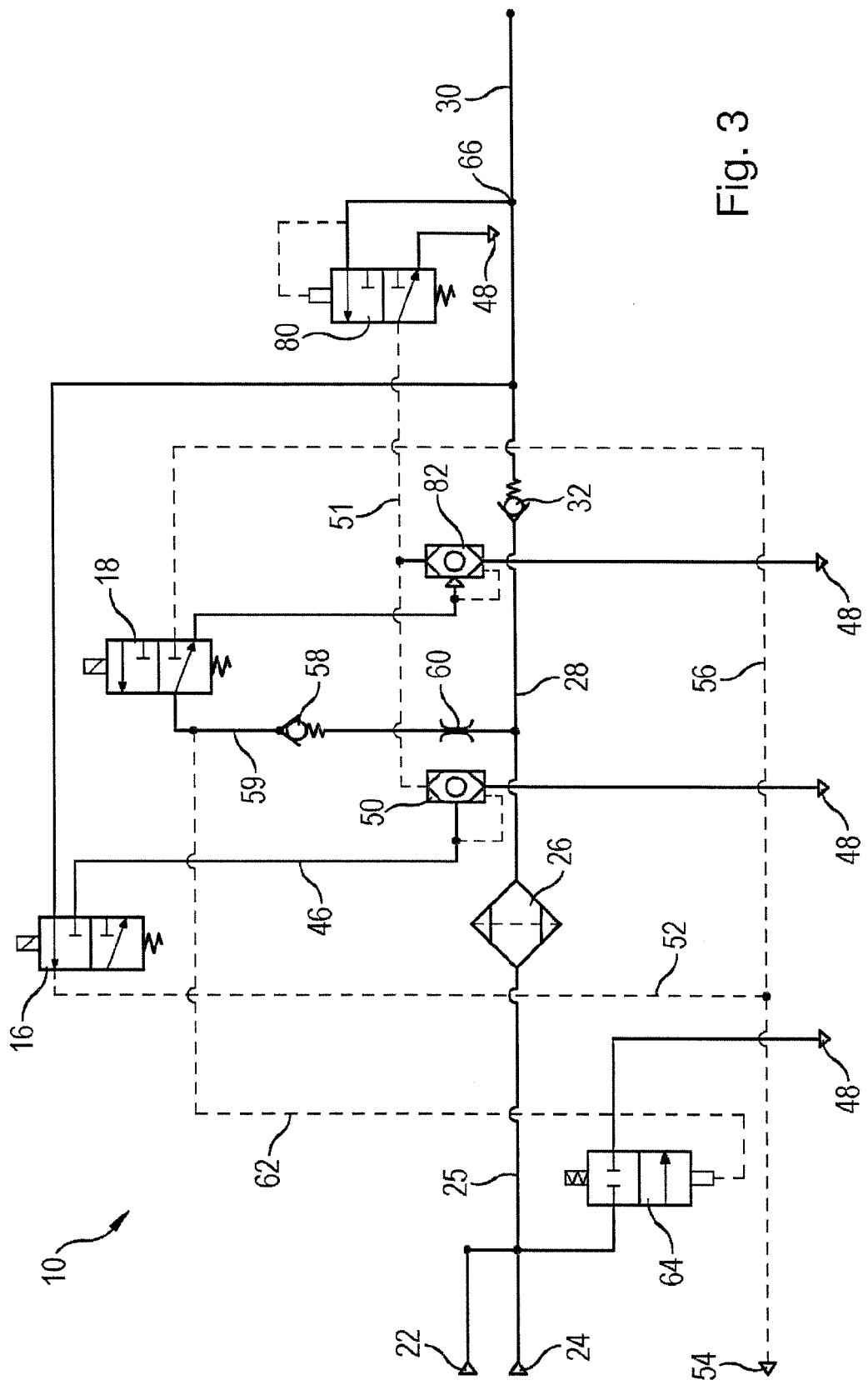
FIG. 3 shows the further compressed air supply device in a second switching mode.

If the operating pressure is reached, the electronic control device can actuate a second switching mode, which is shown in FIG. 3. In the second switching mode, the first control valve 16 is switched by means of the electronic control device into its free-passage position, whereas the second control valve 18 remains in the normal position. Therefore, compressed air can flow via the first control valve 16 from the supply line 30 into the control line 52 and apply pressure to the control inlet 54 of the compressor. Therefore, the compressor is switched into its energy-saving mode. This mode can be referred to as the disengaged mode in which no compressed air is fed via the compressed air inlet 22.

Figure 4:
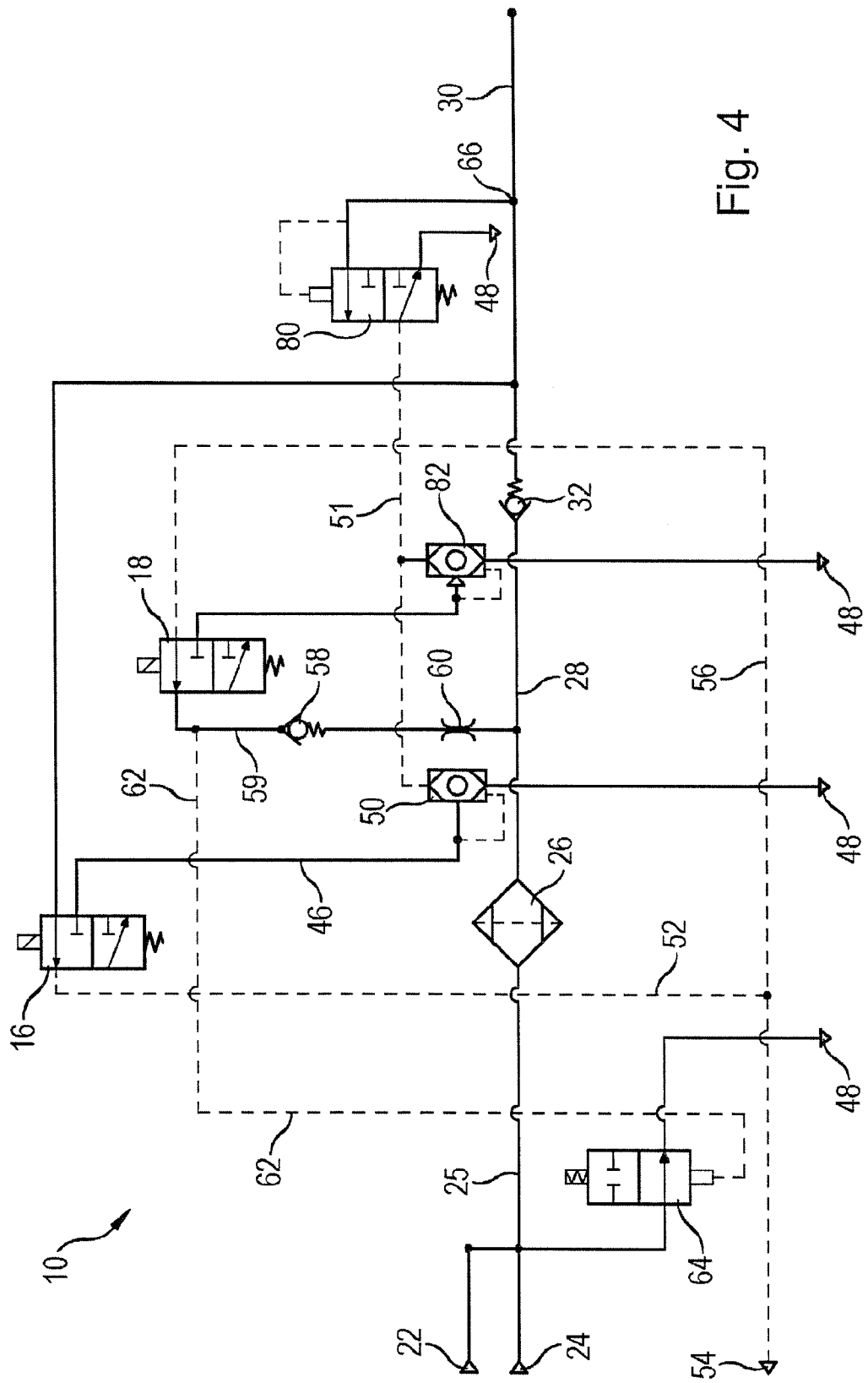
FIG. 4 shows the further compressed air supply device in a third switching mode.

In a third switching mode which is shown in FIG. 4, the electronic control device can also switch the second control valve 18 into its free-passage position, in addition to the first control valve 16. Therefore, the compressor is switched into its energy-saving mode and, via the control line 52, the regeneration line 56 and the second control valve 18, also aerates the regeneration line 59. As a result, the bleed valve 64 is switched into its free-passage position via the bleed control line 62. Therefore, a regeneration of the air filter 26 is carried out via the regeneration check valve 58, the restrictor 60, the air filter 26 and the open bleed valve 64. This switching mode can be referred to as the regeneration mode.

Figure 5:
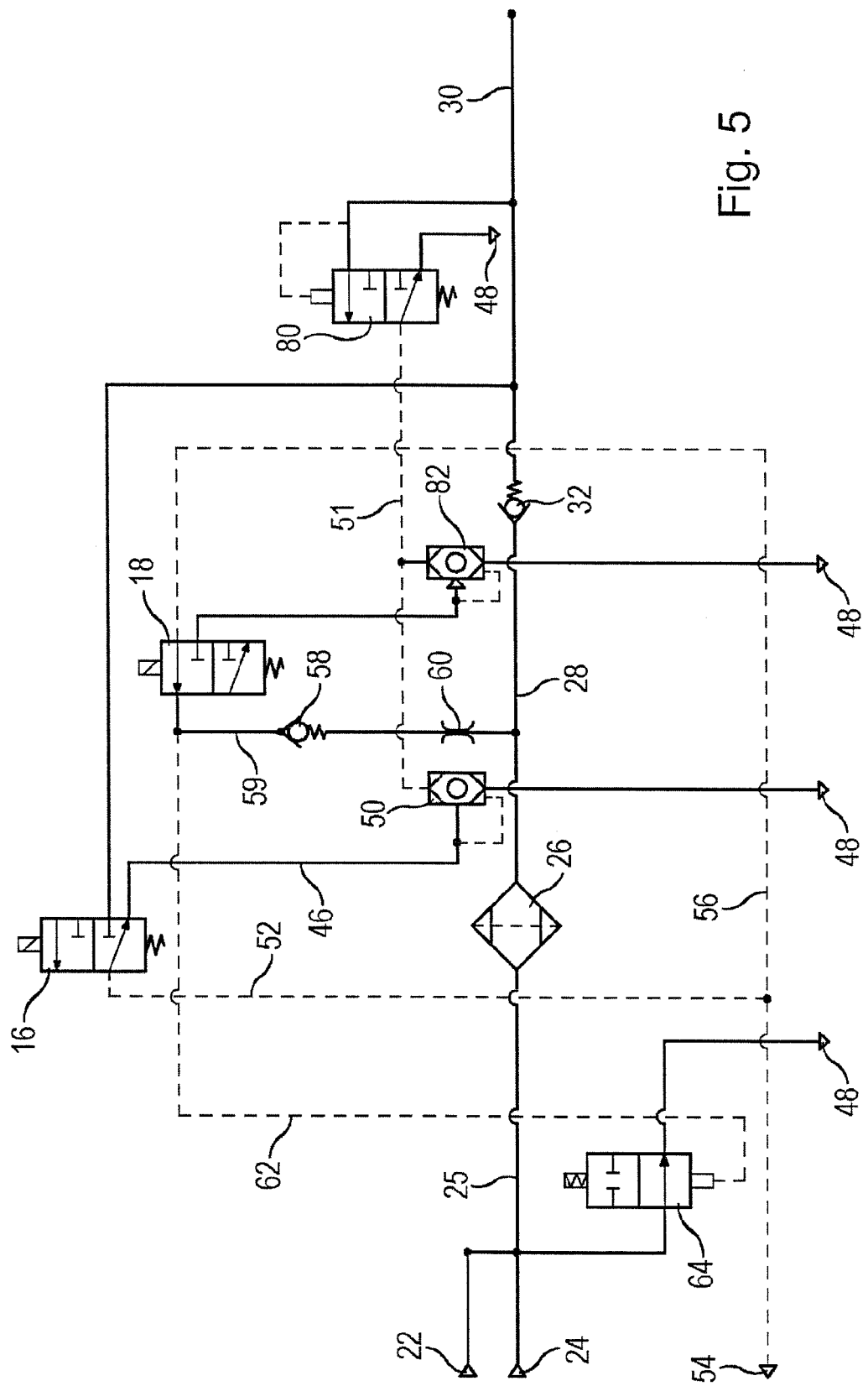
FIG. 5 shows the further compressed air supply device in a fourth switching mode.

If the first control valve 16 is switched from the third switching mode into its normal position, by it no longer being energized, a fourth switching mode is created and is shown in FIG. 5. If the bleed valve 64, on account of residual pressure still present in the line 62, remains open over a certain delay period, air remaining in the lines, especially in the control line 52, can be bled through the regeneration line 59 and the connecting line 28 via the bleed valve 64 and clean the lines in the process. To this end, it can be advantageous if the bleed valve 64 is designed in such a way that it opens, or remains open, in the event of a low pressure in the line 62 and/or at its control port. The fourth switching state can be considered to be a transition state since the residual air in the lines as a rule quickly dissipates.

In the switching modes which are described above, the back-up valve 80 remains in its normal position and the electronic control device is in operation. If, however, the electronic control device fails, the first control valve 16 and the second control valve 18 remain in their normal position. Two further back-up switching modes, however, are created in dependence upon the switching position of the back-up valve 80.

Figure 6:
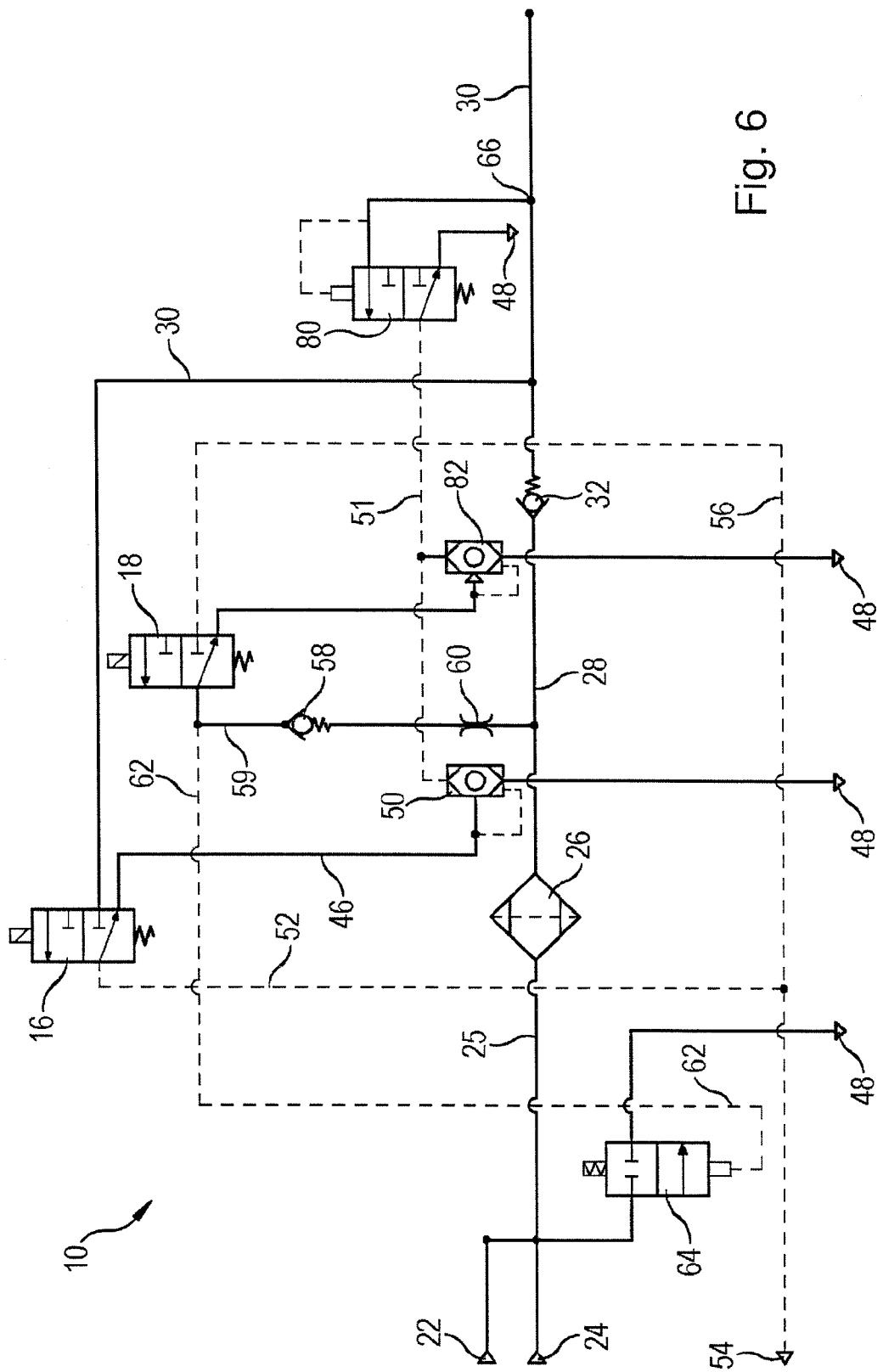
FIG. 6 shows the further compressed air supply device in a fifth switching mode.
Figure 7:
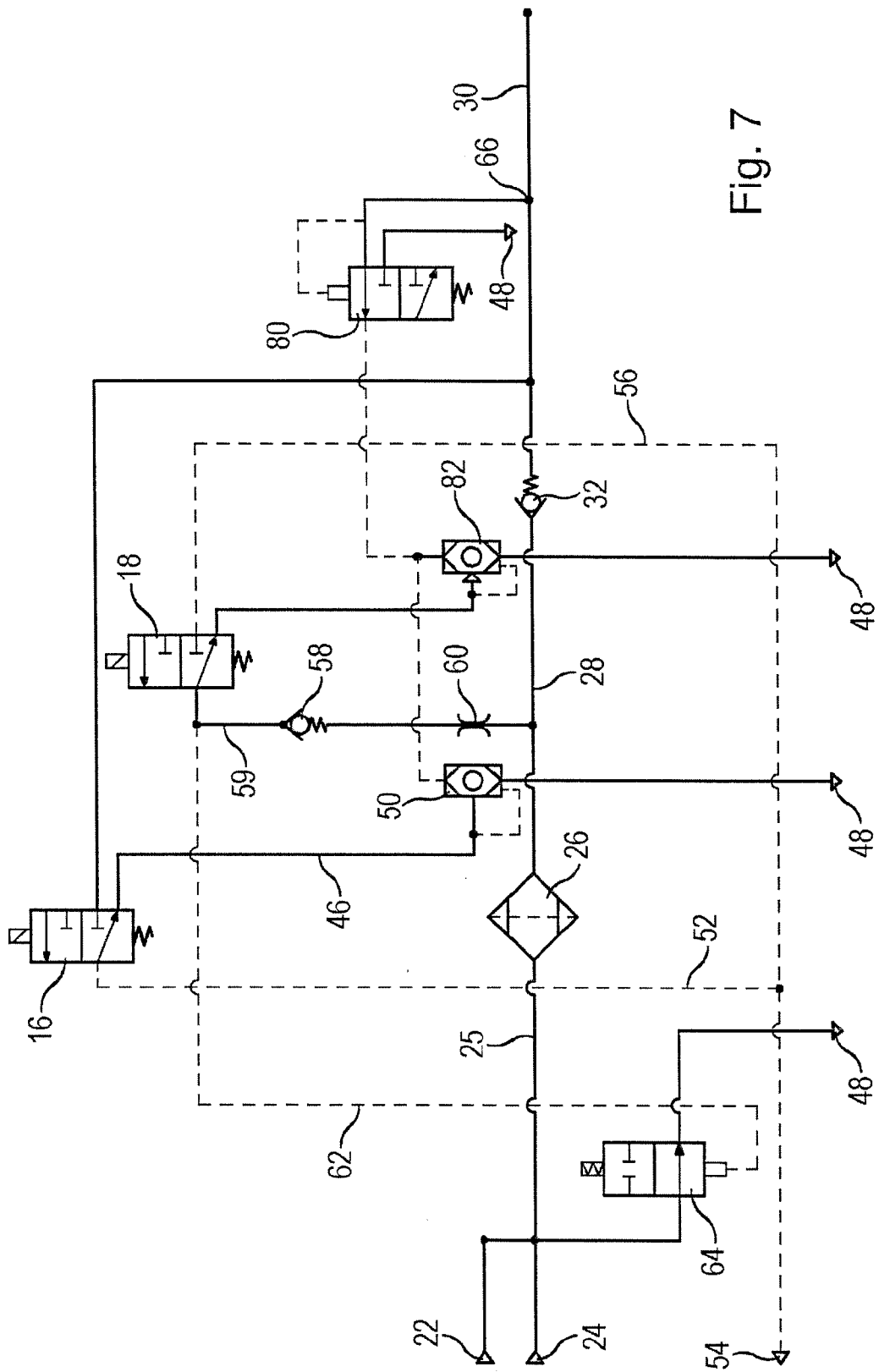
FIG. 7 shows the further compressed air supply device in a sixth switching mode.

The first back-up mode, or fifth switching mode, shown in FIG. 6 is adopted if the back-up valve 80 is in its normal position. This case, with regard to the switching positions of the valves, corresponds to the first switching mode so that the compressor is operated with the aim of feeding compressed air via the compressed air inlet 22. The switching position of the first control valve 16 and of the second control valve 18, however, is now not based on a directed actuation by means of the electronic control device but ensues as a result of the failure thereof.

If now in the supply line 30 the opening pressure of the back-up valve 80 is achieved as a result of compressed air feed from the compressor, this back-up valve pneumatically opens a connection between its outlet and its inlet. This corresponds to the sixth switching mode or to the second back-up mode shown in FIG. 7. As a result, the inlets of the vent valves 50, 82 are aerated via the back-up line 51. Therefore, both vent valves 50, 82 open and create in each case a connection between the outlet of the back-up valve 80 and the vent outlet of the associated control valve 16, 18. Therefore, the control line 52 is aerated from the supply line 30 via the vent port of the control valve 16. Also, the regeneration line 59 is aerated from the supply line 30 via the vent port of the second control valve 18. Therefore, the compressor is switched into its energy-saving mode. Furthermore, a regeneration of the air filter 26 is carried out via the second control valve 18. Therefore, this sixth switching mode functionally corresponds to the third switching mode.

In an alternative embodiment, for example the second vent valve 82 can be dispensed with and the vent outlet of the second control valve 18 can be connected directly to the vent 48. This modification of the compressed air supply device would have no effect upon the first to fifth switching modes. Only in the sixth switching mode could the regeneration line 59 no longer be supplied with compressed air. Therefore, in the sixth switching mode a regeneration would no longer be carried out, but, however, a switching over of the compressor into the energy-saving mode would be carried out, as was explained with regard to FIG. 1.

Via the back-up valve 80, therefore, a controlling of the compressed air supply device 10 in an energy-saving mode or in an energy-saving and regeneration mode is possible without great expense, even though the electronic control device has failed. If the pressure in the supply line 30 drops to a closing pressure, which in this case is 11 bar, the back-up valve 80 closes again. Therefore the back-up line 51 is vented, as a result of which the vent valves 50, 82 are also switched over. Therefore, the vent ports of the first control valve 16 and of the second control valve 18 are also vented, and the compressed air supply device 10 reverts to the first back-up mode.

Figure 8:
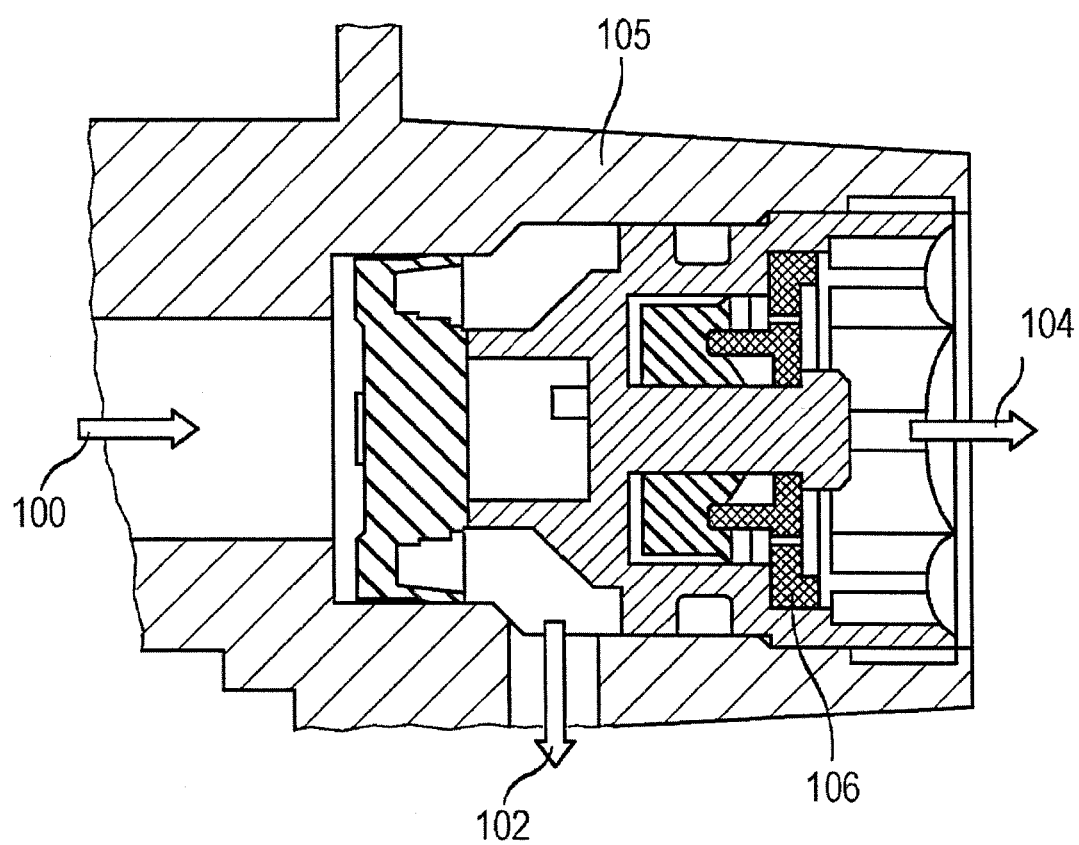
FIG. 8 schematically shows a fast-acting vent valve.

FIG. 8 schematically shows a vent valve, as can be used in the examples referred to above. The vent valve is designed as a fast-acting vent valve and has an inlet 100, an outlet 102 and an air bleed 104, which are formed in a valve housing 105. Accommodated in a holder of the valve housing 105 is also a valve body 106 which is suitably sealed against the valve housing 105 and in which is accommodated a membrane. In its interior, the valve body 106 has a line via which the air bleed 104 and the outlet 102 can be interconnected in a fluid-conducting manner. If a pressure is applied to the inlet 100, the membrane shuts off the connection between the outlet 102 and the air bleed 104 and creates a fluid-conducting connection between the outlet 102 and the inlet 100. In the normal position, the inlet 100 is vented, however, and the membrane shuts off the inlet 100 and opens a connection between the outlet 102 and the air bleed 104. As a result, a large flow cross section for the venting of the outlet via the air bleed 104 can be provided. Furthermore, the membrane enables very fast switching over times of the valve between its switching positions.

The features of the invention which are disclosed in the preceding description, in the drawings and also in the claims can be fundamental both individually and in any combination for the realization of the invention.

LIST OF DESIGNATIONS

10 Compressed air supply device
12 Electronic control device
14 Central connector
16 First control valve
18 Second control valve
20 Sensor device
22 Compressor connection
24 External compressed air connection
25 Inlet line
26 Air filter
28 Connecting line
30 Supply line
32 Check valve
34 Compressed air supply line
36 Relief valve
38 Supply connections
40 Second compressed air supply line
42 Relief valve
43 Branch
44 Consumer connections
45 Branch
46 Vent line
48 Vent
50 Vent valve
51 Back-up line
52 Control line
54 Compressor control connection
56 Regeneration control line
58 Regeneration check valve
59 Regeneration line
60 Regeneration restrictor
62 Bleed valve control line
64 Bleed valve
66 Branch
68 Back-up valve
70 Bypass line
72 Restrictor
80 Back-up valve
82 Vent valve
100 Inlet
102 Outlet
104 Air bleed
105 Valve housing
106 Valve body

The invention claimed is:
1. A compressed air supply device for a commercial vehicle, wherein the compressed air supply device is electrically connectable to an electronic control device, the compressed air supply device comprising:
   at least one control valve, which is actuatable via the electronic control device, wherein the control valve has at least one inlet port, a vent port and an outlet port;
   a control line, which is connected to the outlet port of the control valve, wherein the control line is connectable to a control input of a compressor, and/or to an air filter for a regeneration;
   a supply line, via which compressed air is directable to the inlet port of the control valve;
   a vent line, which is connected to the vent port of the control valve;
   a back-up valve, wherein an inlet of the back-up valve is connected to the supply line and an outlet of the back-up valve is connectable to the vent line; and
   at least one vent valve with an inlet, an outlet and an air bleed, wherein the inlet of the vent valve is connectable to the outlet of the back-up valve and the outlet of the vent valve is connectable to the vent port of the control valve, wherein the back-up valve is operatively configured to pneumatically open if a pressure in the supply line corresponds to, or exceeds, a predetermined opening pressure of the back-up valve.

2. The compressed air supply device according to claim 1, wherein the compressed air supply device has a second control valve, which is actuatable via the electronic control device, wherein an outlet port of the second control valve is connectable to the air filter for the regeneration.

3. The compressed air supply device according to claim 2, wherein a vent port of the second control valve is also connected to an outlet of a second vent valve.

4. The compressed air supply device according to claim 3, wherein the outlet of the back-up valve is connected to an inlet of a second vent valve.

5. The compressed air supply device according to claim 3, wherein between the outlet of the back-up valve and the inlet of the at least one vent valve, a bypass line is provided which is connected to a vent.

6. The compressed air supply device according to claim 2, wherein the outlet of the back-up valve is connected to an inlet of a second vent valve.

7. The compressed air supply device according to claim 2, wherein between the outlet of the back-up valve and the inlet of the at least one vent valve, a bypass line is provided which is connected to a vent.

8. The compressed air supply device according to claim 1, wherein the outlet of the back-up valve is connected to an inlet of a second vent valve.

9. The compressed air supply device according to claim 8, wherein between the outlet of the back-up valve and the inlet of the at least one vent valve, a bypass line is provided which is connected to a vent.

10. The compressed air supply device according to claim 1, wherein between the outlet of the back-up valve and the inlet of the at least one vent valve, a bypass line is provided which is connected to a vent.

11. The compressed air supply device according to 10, wherein a restrictor is provided in the bypass line.

12. The compressed air supply device according to claim 1, wherein the at least one vent valve is a fast-acting vent valve.

13. The compressed air supply device according to claim 1, wherein the opening pressure of the back-up valve is higher than an operating pressure, which is establishable by the electronic control device.

14. The compressed air supply device according to claim 13, wherein the back-up valve is operatively configured to pneumatically close if the pressure in the supply line has dropped to a pressure below a predetermined closing pressure.

15. The compressed air supply device according to claim 1, wherein the back-up valve is operatively configured to pneumatically close if the pressure in the supply line has dropped to a pressure below a predetermined closing pressure.

* * * * *